(12) United States Patent
Nguyen

(10) Patent No.: US 11,908,263 B1
(45) Date of Patent: Feb. 20, 2024

(54) METHOD FOR AUTHORIZING A USER TO DRIVE A VEHICLE

(71) Applicant: MK GROUP JSC, Hanoi (VN)

(72) Inventor: Khang Trong Nguyen, Hanoi (VN)

(73) Assignee: MK GROUP JSC, Hanoi (VN)

( * ) Notice: Subject to any disclaimer, the term of this patent is extended or adjusted under 35 U.S.C. 154(b) by 0 days.

(21) Appl. No.: 17/899,433

(22) Filed: Aug. 30, 2022

(51) Int. Cl.
*G07C 9/25* (2020.01)
*B60R 25/25* (2013.01)
*B60R 25/24* (2013.01)

(52) U.S. Cl.
CPC ............... *G07C 9/25* (2020.01); *B60R 25/24* (2013.01); *B60R 25/25* (2013.01)

(58) Field of Classification Search
CPC ............ G07C 9/25; B60R 25/24; B60R 25/25
See application file for complete search history.

(56) References Cited

U.S. PATENT DOCUMENTS

| | | | |
|---|---|---|---|
| 7,702,918 B2 * | 4/2010 | Tattan | H04L 67/1023 726/8 |
| 9,242,619 B2 * | 1/2016 | Choi | B60R 25/25 |
| 9,635,518 B2 * | 4/2017 | Lee | H04W 4/029 |
| 10,986,466 B2 * | 4/2021 | Dekovich | H04B 17/318 |
| 11,048,105 B1 * | 6/2021 | Roy | G06F 3/041 |
| 2006/0293892 A1 * | 12/2006 | Pathuel | G06F 21/32 704/E17.003 |
| 2007/0235526 A1 * | 10/2007 | Goldberg | G07C 9/00563 235/382 |

* cited by examiner

*Primary Examiner* — Thomas D Alunkal
(74) *Attorney, Agent, or Firm* — Hamre, Schumann, Mueller & Larson, P.C.

(57) ABSTRACT

A method for authorizing a user to drive a vehicle is provided. A verification code is generated based on eID card information of the user, and is provided to the user and the vehicle. The vehicle includes a biometric device to ensure that the one who enters the vehicle and inputs the verification code is the user. After the code inputted by the user is successfully verified to be identical to the verification code, the vehicle permits driving operation.

14 Claims, 2 Drawing Sheets

METHOD FOR AUTHORIZING A USER TO DRIVE A VEHICLE

FIELD

The disclosure relates to an authorization method, and more particularly to a method for authorizing a user to drive a vehicle.

BACKGROUND

Vehicle rental is a service that offers vehicles for rent by specific persons (e.g., renters) within specific periods of time. However, after a vehicle has been rented out to a renter, the vehicle rental agency is unable to ensure that the renter is the one who actually uses the vehicle.

SUMMARY

Therefore, an object of the disclosure is to provide a method that can alleviate at least one of the drawbacks of the prior art.

According to the disclosure, a method for authorizing a user to drive a vehicle is provided. In one step, a computer device that is away from the vehicle receives electronic identification (eID) card information that is acquired from an eID card of the user The eID card stores a pre-established biological feature of the user therein. In one step, the computer device generates a verification code based on the eID card information and vehicle information that is related to the vehicle. In one step, the computer device transmits the verification code to the user and the vehicle. In one step, a biometric device that is installed in the vehicle extracts a biological feature of the user to obtain an extracted biological feature, and transmits the extracted biological feature to an embedded computer of the vehicle. In one step, the embedded computer in cooperation with a card reader that is installed in the vehicle and that is capable of accessing the eID card obtains a result of comparison between the extracted biological feature and the pre-established biological feature stored in the eID card. In one step, the embedded computer requests the user to input the verification code when the result of the comparison indicates that the extracted biological feature matches the pre-established biological feature. In one step, upon receipt of a user input code that is inputted through an input device in response to the request of inputting the verification code, the embedded computer compares the user input code with the verification code. In one step, the embedded computer permits driving operation of the vehicle upon determining that the user input code is identical to the verification code.

Another object of the disclosure is to provide a system that can alleviate at least one of the drawbacks of the prior art.

According to the disclosure, a system for a vehicle to authorize a user to drive the vehicle is provided to include a wireless communication module, a card reader, a biometric device, an embedded computer, and an input device. The wireless communication module is to be mounted to the vehicle, and is configured to receive a verification code that is related to an electronic identification (eID) card of the user from a computer device that is away from the vehicle. The eID card stores a pre-established biological feature of the user. The card reader is to be installed in the vehicle, and is configured to perform data transmission with the eID card of the user. The biometric device is to be installed in the vehicle, and is configured to extract a biological feature of the user to obtain an extracted biological feature. The embedded computer is to be mounted to the vehicle, is electrically connected to the wireless communication module, the card reader and the biometric device, and is configured to receive the verification code from the wireless communication module, to receive the extracted biological feature from the biometric device, and to cooperate with the card reader to obtain a result of comparison between the extracted biological feature and the pre-established biological feature. The input device is to be installed in the vehicle, and is configured to receive a user input code that is inputted by the user. The embedded computer is further configured to request the user to input the verification code when the result of the comparison indicates that the extracted biological feature matches the pre-established biological feature, to receive the user input code that is inputted by the user in response to the request of inputting the verification code, and to permit driving operation of the vehicle upon determining that the user input code is identical to the verification code.

According to the disclosure, a method is provided for a vehicle to authorize a user to drive the vehicle. In one step, a wireless communication module that is mounted to the vehicle receives a verification code that is related to an electronic identification (eID) card of the user from a computer device that is away from the vehicle. The eID card stores a pre-established biological feature of the user. In one step, a biometric device that is installed in the vehicle extracts a biological feature of the user to obtain an extracted biological feature, and transmits the extracted biological feature to an embedded computer of the vehicle. In one step, the embedded computer in cooperation with a card reader that is installed in the vehicle and that is capable of accessing the eID card of the user obtains a result of comparison between the extracted biological feature and the pre-established biological feature. In one step, the embedded computer requests the user to input the verification code when the result of the comparison indicates that the extracted biological feature matches the pre-established biological feature. In one step, upon receipt of a user input code that is inputted through an input device that is installed in the vehicle in response to the request of inputting the verification code, the embedded computer compares the user input code with the verification code. In one step, the embedded computer permits driving operation of the vehicle upon determining that the user input code is identical to the verification code.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
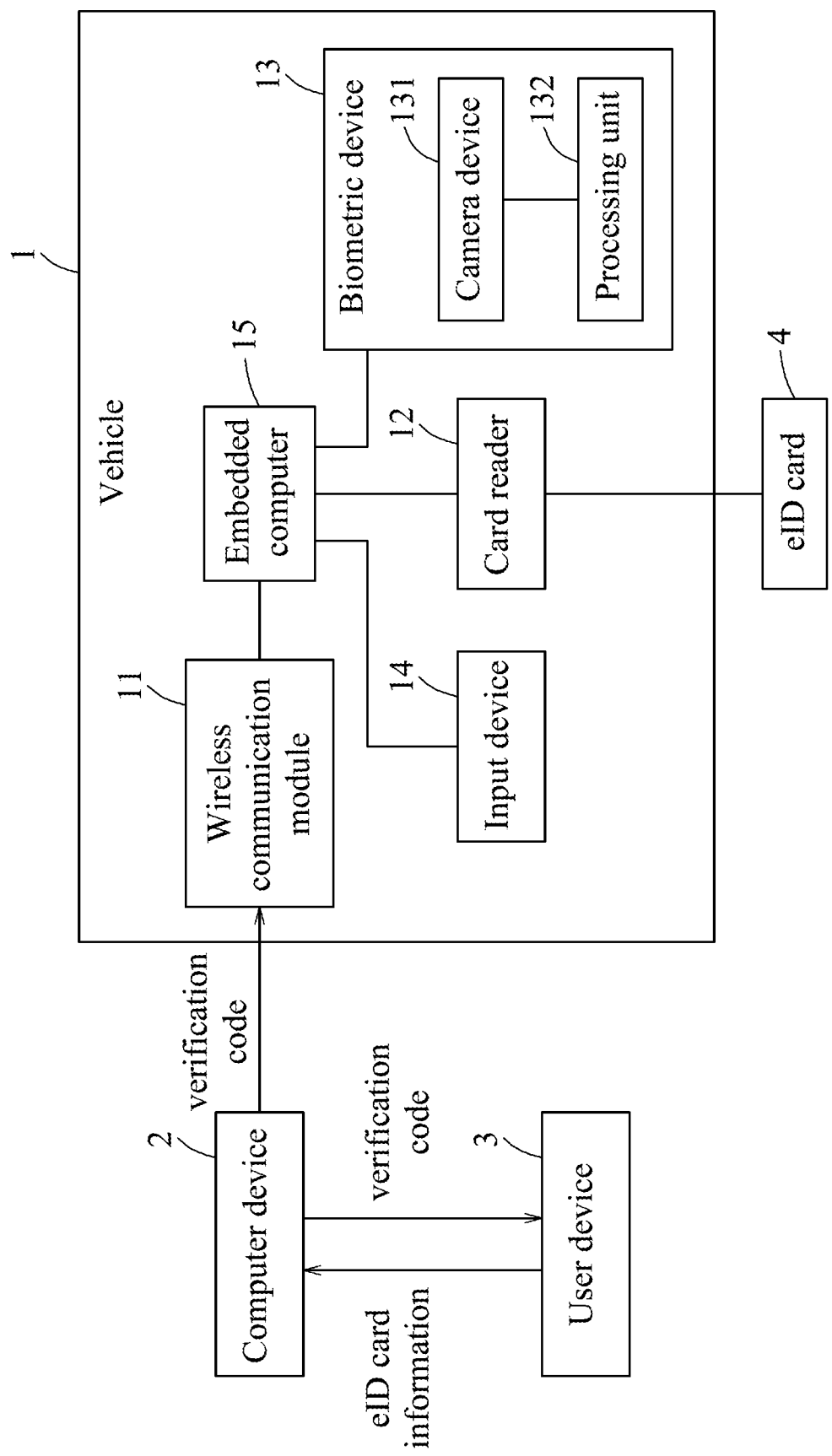
FIG. 1 is a block diagram illustrating an embodiment of a system for authorizing a user to drive a vehicle according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
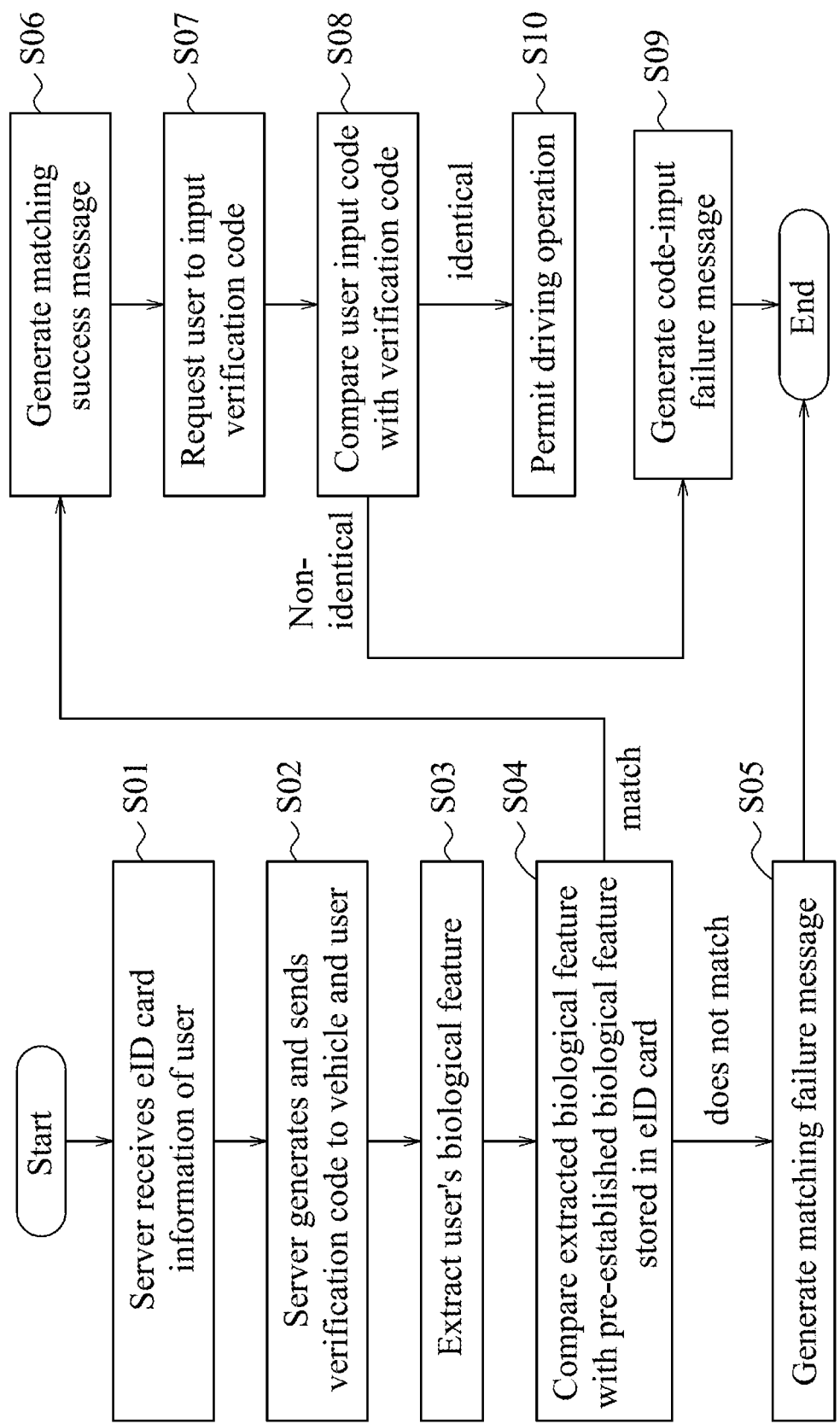
FIG. 2 is a flow chart illustrating steps of an embodiment of a method for authorizing a user to drive the vehicle according to the disclosure.

Referring to FIGS. 1 and 2, an embodiment of a method for authorizing a user to drive a vehicle 1 according to this disclosure is provided. The vehicle 1 includes a wireless communication module 11, a card reader 12, a biometric device 13, an input device 14, and an embedded computer 15 (e.g., an electronic control unit, ECU) that is electrically connected to the wireless communication module 11, the card reader 12, the biometric device 13, and the input device 14.

In this embodiment, the method is used in a scenario where a user intends to rent a vehicle from a vehicle rental service provider, but this disclosure is not limited in this respect. The vehicle rental service provider has a computer device 2 that is away from the vehicle 1. The computer device 2 may be, for example but not limited to, a server that manages the vehicle rental service for multiple vehicle rental shops of the vehicle rental service provider, or a computer that is located at a vehicle rental shop of the vehicle rental service provider, etc. The computer device 2 receives electronic identification (eID) card information that is acquired from an eID card 4 of the user who wants to rent a vehicle from the vehicle rental service provider (step S01). In a case that the computer device 2 is a server, the user may operate a computing device (e.g., a smartphone, a tablet computer, a notebook computer, a desktop computer, etc.) that is connected to or equipped with a card reader to read the eID card information from the eID card 4 of the user, and to transmit the eID card information to the computer device 2 through, for example but not limited to, the Internet or a telecommunication network. In a case that the computer device 2 is a computer that is located at a vehicle rental shop, the user may walk into the vehicle rental shop to proceed with a registration process at a counter, where the user passes the eID card 4 to a clerk at the counter, who then uses a card reader that is connected to the computer device 2 to obtain the eID card information from the eID card 4. The eID card information may include, for example but not limited to, a name of the user, a date of birth of the user, a place of residence of the user, a nationality of the user, and/or a card number of the eID card 4. After receiving the eID card information, the computer device 2 generates a verification code based on at least the eID card information and vehicle information that is related to a vehicle to be rented out to the user, which is exemplified to be the vehicle 1. In this embodiment, the vehicle information may include a license plate number of the vehicle 1, but this disclosure is not limited in this respect. In some embodiments, the verification code may be generated based on the eID card information, the vehicle information, and rental information that may include, for example but not limited to, a number of rental days and/or a rental period for renting the vehicle 1. The verification code may consist of multiple numbers and may be generated using, for example, secure hash algorithm 1 (SHA-1), Base32 encoding, or hash-based message authentication code (HMAC), but this disclosure is not limited in this respect. Then, the computer device 2 sends the verification code to a user device 3 of the user (e.g., a mobile phone, a notebook computer, a tablet computer, a desktop computer, etc.) and to the vehicle 1 (step S02). The verification code may be provided to the user through, for example but not limited to, the Internet and/or a telecommunication network. The verification code may be provided to the vehicle 1 through, for example but not limited to, the Internet, a telecommunication network, a local area network, etc. In addition to the verification code, the computer device 2 may also send information of the license plate number and a parking location of the vehicle 1 to the user, so the user can find the vehicle 1. After completion of the registration process, the clerk at the counter may pass a vehicle key to the user.

The wireless communication module 11 is mounted to the vehicle 1, and may include an antenna or a transceiver module to wirelessly communicate with the computer device 2 to receive the verification code, and to transmit the verification code to the embedded computer 15.

After receipt of the verification code and the information of the license plate number and the parking location of the vehicle 1, the user may walk to the parking location to get the vehicle 1.

When the user enters the vehicle 1 and intends to start the vehicle 1, the embedded computer 15 may output a message through, for example, a display or a speaker in the vehicle 1, to request the user to complete a verification process for acquiring permission to drive the vehicle 1. In the first step of the verification process, the embedded computer controls the biometric device 13 to extract a biological feature of the user to obtain an extracted biological feature (step S03), and to transmit the extracted biological feature to the embedded computer 15. In this embodiment, the biometric device 13 is installed in the vehicle 1, and includes a camera device 131 to capture a facial image of the user, and a processing unit 132 (e.g., a processor or a microcontroller) electrically connected to the camera device 131. The processing unit 132 receives the facial image of the user from the camera device 131, extracts a facial feature of the user from the facial image and makes the facial feature thus extracted serve as the extracted biological feature, and transmits the extracted biological feature to the embedded computer 15. Extraction of the facial feature from the facial image may be performed using a conventional facial recognition technique, which is not a focus of this disclosure, so details thereof are omitted herein for the sake of brevity. In some embodiments, the biometric device 13 may be configured to extract other types of biological features. For example, the biometric device 13 may include a fingerprint sensor in cooperation with the processing unit 132 to extract a fingerprint feature that serves as the extracted biological feature. In practice, extracting a facial feature from a facial image may be more time-efficient and have a higher accuracy in verification in comparison to extracting other types of biological features, but this disclosure is not limited in this respect. In some embodiments, the processing unit 132 may be integrated into the embedded computer 15, so the biological feature is extracted by the embedded computer 15 from the facial image, and this disclosure is not limited in this respect.

The card reader 12 is installed in the vehicle 1, and is configured to perform data transmission between the embedded computer 15 and the eID card 4 by direct contact with the eID card 4 or by short-range wireless communication (e.g., radio frequency identification (RFID) technology). The eID card 4 stores a pre-established biological feature of the user, which may be, for example, a pre-established facial feature, a pre-established fingerprint feature, etc. In the verification process, the embedded computer 15 may request the user to insert the eID card 4 into the card reader 12 or place the eID card 4 onto the card reader 12, so that the card reader 12 can access the eID card 4. In the second step of the verification process, the embedded computer 15 cooperates with the card reader 12 to obtain a result of comparison between the extracted biological feature and the pre-established biological feature that is stored in the eID card 4 (step S04). In some embodiments, the card reader 12 reads the pre-established biological feature from the eID card 4, includes a processor or microcontroller to compare the extracted biological feature with the pre-established biological feature, and transmits the result of the comparison to the embedded computer 15. In some embodiments, the card reader 12 transmits the extracted biological feature to the eID card 4, and the eID card 4 compares the extracted biological feature with the pre-established biological feature using, for example but not limited to, the match-on-card (MoC) technology, and transmits the result of the comparison to the embedded computer 15 through the card reader 12. In some embodiments, the card reader 12 reads out the pre-established biological feature from the eID card 4, and transmits the pre-established biological feature to the embedded computer 15 for the embedded computer 15 to compare the extracted biological feature with the pre-established biological feature. The matching/comparison between the extracted biological feature and the pre-established biological feature is performed using a conventional technique, which is not a focus of this disclosure, so details thereof are omitted herein for the sake of brevity.

When the result of the comparison indicates that the extracted biological feature does not match the pre-established biological feature, the embedded computer 15 generates and outputs a matching failure message that indicates the failure of the matching through the display or the speaker (step S05). When the result of the comparison indicates that the extracted biological feature matches the pre-established biological feature, the embedded computer 15 generates and outputs a matching success message that indicates the successful matching (step S06), and requests, through the display or the speaker, the user to input the verification code (step S07). In response to the request, the user may operate the input device 14 to input a code (referred to as user input code hereinafter) to the embedded computer 15. In some embodiments, the input device 14 may include a keypad for the user to manually input the verification code. In some embodiments, the input device 14 may include a barcode scanner or a camera (e.g., the camera device 131 of the biometric device 13) when the verification code that the user has received from the computer device 2 is in the form of a barcode (e.g., a QR code), and the user inputs the verification code by having the barcode scanned by the input device 14. However, the input device 14 is not limited to specific types in this disclosure.

The embedded computer 15, which had received the verification code from the computer device 2 through the wireless communication module 11 in step S02, receives the user input code through the input device 14, and compares the user input code with the verification code (step S08). Upon determining that the user input code is not identical to the verification code, the embedded computer 15 may output a code-input failure message (step S09) indicating that the user input code is incorrect (i.e., not identical to the verification code). Upon determining that the user input code is identical to the verification code, the embedded computer 15 may output a code-input success message indicating that the user input code is correct, and permit driving operation of the vehicle 1 (i.e., allowing the vehicle 1 to be driven) (step S10), so the user can use the vehicle key to start the vehicle 1 and drive the vehicle 1.

In summary, the embodiment of this disclosure generates the verification code based on the eID card information that is acquired from the eID card of the user, and uses the biological feature to make sure that that renter is the one who enters the vehicle 1 and inputs the verification code, thereby ensuring that the vehicle 1 is used by the renter.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for authorizing a user to drive a vehicle, comprising steps of:
   by a computer device that is away from the vehicle, receiving electronic identification (eID) card information that is acquired from an eID card of the user, the eID card storing a pre-established biological feature of the user therein;
   by the computer device, generating a verification code based on the eID card information and vehicle information that is related to the vehicle;
   by the computer device, transmitting the verification code to the user and the vehicle;
   by a biometric device that is installed in the vehicle, extracting a biological feature of the user to obtain an extracted biological feature, and transmitting the extracted biological feature to an embedded computer of the vehicle;
   by the embedded computer in cooperation with a card reader that is installed in the vehicle and that is capable of accessing the eID card, obtaining a result of comparison between the extracted biological feature and the pre-established biological feature stored in the eID card;
   by the embedded computer, requesting the user to input the verification code when the result of the comparison indicates that the extracted biological feature matches the pre-established biological feature;
   by the embedded computer, upon receipt of a user input code that is inputted through an input device in response to the request of inputting the verification code, comparing the user input code with the verification code; and
   by the embedded computer, permitting driving operation of the vehicle upon determining that the user input code is identical to the verification code.

2. The method of claim 1, wherein the step of obtaining the result of the comparison includes:

by the card reader, reading the pre-established biological feature from the eID card; and by one of the card reader and the embedded computer, comparing the extracted biological feature with the pre-established biological feature.

3. The method of claim 1, wherein the step of obtaining the result of the comparison includes:

by the embedded computer, transmitting the extracted biological feature to the eID card through the card reader for the eID card to compare the extracted biological feature with the pre-established biological feature, and receiving the result of the comparison from the eID card through the card reader.

4. The method of claim 1, wherein the eID card information includes one of a name of the user, a date of birth of the user, a place of residence of the user, a nationality of the user, and a card number of the eID card; and wherein the vehicle information includes a license plate number of the vehicle.

5. The method of claim 4, wherein the vehicle is to be rented by the user, and said method further comprises a step of:

by the computer device, receiving rental information that includes one of a number of rental days and a rental period for renting the vehicle; and wherein the verification code is generated based on the eID card information, the vehicle information and the rental information.

6. The method of claim 5, wherein the biometric device includes a camera device and a processing unit, and the step of extracting the biological feature of the user includes:

by the camera device, capturing a facial image of the user; and by the processing unit, extracting a facial feature of the user that serves as the extracted biological feature; and wherein the pre-established biological feature is a pre-established facial feature of the user.

7. A system for a vehicle to authorize a user to drive the vehicle, comprising:

a wireless communication module to be mounted to the vehicle, and configured to receive a verification code that is related to an electronic identification (eID) card of the user from a computer device that is away from the vehicle, the eID card storing a pre-established biological feature of the user;

a card reader to be installed in the vehicle, and configured to perform data transmission with the eID card of the user;

a biometric device to be installed in the vehicle, and configured to extract a biological feature of the user to obtain an extracted biological feature;

an embedded computer to be mounted to the vehicle, electrically connected to said wireless communication module, said card reader and said biometric device, and configured to receive the verification code from said wireless communication module, to receive the extracted biological feature from said biometric device, and to cooperate with said card reader to obtain a result of comparison between the extracted biological feature and the pre-established biological feature; and an input device to be installed in the vehicle, and configured to receive a user input code that is inputted by the user;

wherein said embedded computer is further configured to request the user to input the verification code when the result of the comparison indicates that the extracted biological feature matches the pre-established biological feature, to receive the user input code that is inputted by the user in response to the request of inputting the verification code, and to permit driving operation of the vehicle upon determining that the user input code is identical to the verification code.

8. The system of claim 7, wherein said card reader is configured to read the pre-established biological feature from the eID card, and one of said embedded computer and said card reader is configured to compare the extracted biological feature with the pre-established biological feature.

9. The system of claim 7, wherein said card reader is configured to transmit the extracted biological feature to the eID card for the eID card to compare the extracted biological feature with the pre-established biological feature, and to receive the result of the comparison from the eID card through said card reader.

10. The system of claim 7, wherein said biometric device includes:

a camera device configured to capture a facial image of the user; and a processing unit configured to extract a facial feature of the user that serves as the extracted biological feature; and wherein the pre-established biological feature is a pre-established facial feature of the user.

11. A method for a vehicle to authorize a user to drive the vehicle, comprising:

by a wireless communication module that is mounted to the vehicle, receiving a verification code that is related to an electronic identification (eID) card of the user from a computer device that is away from the vehicle, the eID card storing a pre-established biological feature of the user;

by a biometric device that is installed in the vehicle, extracting a biological feature of the user to obtain an extracted biological feature, and transmitting the extracted biological feature to an embedded computer of the vehicle;

by the embedded computer in cooperation with a card reader that is installed in the vehicle and that is capable of accessing the eID card of the user, obtaining a result of comparison between the extracted biological feature and the pre-established biological feature;

by the embedded computer, requesting the user to input the verification code when the result of the comparison indicates that the extracted biological feature matches the pre-established biological feature;

by the embedded computer, upon receipt of a user input code that is inputted through an input device that is installed in the vehicle in response to the request of inputting the verification code, comparing the user input code with the verification code; and by the embedded computer, permitting driving operation of the vehicle upon determining that the user input code is identical to the verification code.

12. The method of claim 11, wherein the step of obtaining the result of the comparison includes:

by the card reader, reading the pre-established biological feature from the eID card; and by one of the embedded computer and the card reader, comparing the extracted biological feature with the pre-established biological feature.

13. The method of claim 11, wherein the step of obtaining the result of the comparison includes:

by the embedded computer, transmitting the extracted biological feature to the eID card through the card reader for the eID card to compare the extracted biological feature with the pre-established biological feature, and receiving the result of the comparison from the eID card through the card reader.

14. The method of claim 11, wherein the biometric device includes a camera device and a processing unit, and the step of extracting the biological feature of the user includes:
 by the camera device, capturing a facial image of the user; and
 by the processing unit of the biometric device, extracting a facial feature of the user that serves as the extracted biological feature; and
 wherein the pre-established biological feature is a pre-established facial feature of the user.

\* \* \* \* \*